(12) United States Patent
Harris et al.

(10) Patent No.: US 8,914,615 B2
(45) Date of Patent: Dec. 16, 2014

(54) MAPPING SAME LOGICAL REGISTER SPECIFIER FOR DIFFERENT INSTRUCTION SETS WITH DIVERGENT ASSOCIATION TO ARCHITECTURAL REGISTER FILE USING COMMON ADDRESS FORMAT

(75) Inventors: Glen Andrew Harris, Austin, TX (US); James Nolan Hardage, Austin, TX (US); Mark Carpenter Glass, Dripping Springs, TX (US)

(73) Assignee: ARM Limited, Cambridge (GB)

( * ) Notice: Subject to any disclaimer, the term of this patent is extended or adjusted under 35 U.S.C. 154(b) by 464 days.

(21) Appl. No.: 13/309,732

(22) Filed: Dec. 2, 2011

(65) Prior Publication Data

US 2013/0145126 A1    Jun. 6, 2013

(51) Int. Cl.
  *G06F 9/34* (2006.01)
  *G06F 9/38* (2006.01)
  *G06F 9/30* (2006.01)
(52) U.S. Cl.
  CPC .............. *G06F 9/384* (2013.01); *G06F 9/3012* (2013.01); *G06F 9/34* (2013.01); *G06F 9/3824* (2013.01)
  USPC ...... 712/208; 712/210; 712/217; 712/E9.027; 712/E9.038
(58) Field of Classification Search
  CPC ... G06F 9/384; G06F 9/3012; G06F 9/30112; G06F 9/30098; G06F 9/30196; G06F 9/30105
  See application file for complete search history.

(56) References Cited

U.S. PATENT DOCUMENTS

| | | |
|---|---|---|
| 3,629,850 A | 12/1971 | Clark et al. |
| 3,943,494 A | 3/1976 | Holmes, Jr. et al. |
| 4,053,947 A | 10/1977 | Carlsson et al. |
| 4,065,808 A | 12/1977 | Schomberg et al. |
| 4,128,873 A | 12/1978 | Lamiaux |
| 4,296,468 A | 10/1981 | Bandoh et al. |
| 4,307,445 A | 12/1981 | Tredennick et al. |
| 4,589,085 A | 5/1986 | Pierce |
| 5,101,483 A | 3/1992 | Tanagawa |

(Continued)

FOREIGN PATENT DOCUMENTS

| | | |
|---|---|---|
| EP | 0 573 071 | 12/1993 |
| JP | 61-122743 A | 6/1986 |

(Continued)

OTHER PUBLICATIONS

International Search Report and Written Opinion of the International Searching Authority mailed Dec. 14, 2012 in PCT/GB2012/052431.

*Primary Examiner* — Kenneth Kim
(74) *Attorney, Agent, or Firm* — Nixon & Vanderhye P.C.

(57) ABSTRACT

A processor core supports execution of program instruction from both a first instruction set and a second instruction set. An architectural register file 18 containing architectural registers is shared by the two instruction sets. The two instruction sets employ logical register specifiers which for at least some values of those logical registers specifiers correspond to different architectural registers within the architectural register file 18. A first decoder 4 for the first instruction set and a second decoder 6 for the second instruction set serve to decode the logical register specifiers to a common register addressing format. This common register addressing format is used to supply register specifiers to renaming circuitry 10 for supporting register renaming in conjunction with a physical register file 16 and an architectural register file 18.

23 Claims, 9 Drawing Sheets

(56) References Cited

U.S. PATENT DOCUMENTS

| | | | |
|---|---|---|---|
| 5,127,096 | A | 6/1992 | Kaneko et al. |
| 5,136,700 | A | 8/1992 | Thacker |
| 5,301,285 | A | 4/1994 | Hanawa et al. |
| 5,475,824 | A | 12/1995 | Grochowski et al. |
| 5,481,693 | A | 1/1996 | Blomgren et al. |
| 5,542,059 | A | 7/1996 | Blomgren |
| 5,546,553 | A | 8/1996 | Robertson et al. |
| 5,568,646 | A | 10/1996 | Jaggar |
| 5,598,546 | A | 1/1997 | Blomgren |
| 5,638,525 | A | 6/1997 | Hammond et al. |
| 5,758,115 | A | 5/1998 | Nevill |
| 5,852,726 | A | 12/1998 | Lin et al. |
| 5,918,031 | A | 6/1999 | Morrison et al. |
| 6,237,083 | B1 | 5/2001 | Favor |
| 6,433,786 | B1 | 8/2002 | Jones, Jr. |
| 7,353,368 | B2 * | 4/2008 | Chow et al. .................. 712/229 |
| 2001/0022751 | A1 | 9/2001 | Nagai |
| 2002/0007450 | A1 | 1/2002 | Witt et al. |
| 2002/0010847 | A1 | 1/2002 | Abdallah et al. |
| 2002/0013892 | A1 | 1/2002 | Gorishek, IV et al. |
| 2002/0042909 | A1 | 4/2002 | Van Gageldonk et al. |
| 2002/0066003 | A1 | 5/2002 | Nevill et al. |
| 2002/0188825 | A1 | 12/2002 | Seal et al. |
| 2002/0188826 | A1 | 12/2002 | Rose et al. |
| 2003/0126587 | A1 | 7/2003 | Rosner et al. |
| 2004/0015904 | A1 | 1/2004 | Jourdan et al. |
| 2004/0098568 | A1 | 5/2004 | Nguyen |
| 2004/0172519 | A1 | 9/2004 | Nakajima |
| 2004/0186981 | A1 | 9/2004 | Christie et al. |
| 2005/0027968 | A1 | 2/2005 | Rupley, II et al. |
| 2005/0132170 | A1 | 6/2005 | Leijten |
| 2005/0262329 | A1 | 11/2005 | Krishnan et al. |
| 2006/0004942 | A1 | 1/2006 | Hetherington et al. |
| 2006/0288193 | A1 | 12/2006 | Hsu |
| 2007/0005939 | A1 | 1/2007 | Latorre et al. |
| 2007/0006231 | A1 | 1/2007 | Wang et al. |
| 2008/0016324 | A1 | 1/2008 | Burky et al. |
| 2008/0040587 | A1 | 2/2008 | Burke et al. |
| 2008/0195850 | A1 | 8/2008 | Abernathy et al. |
| 2009/0150701 | A1 | 6/2009 | Nagao et al. |
| 2010/0268919 | A1 * | 10/2010 | Chaudhry et al. ............ 712/210 |
| 2011/0225397 | A1 | 9/2011 | Grisenthwaite et al. |
| 2011/0239062 | A1 | 9/2011 | Noda |
| 2012/0042144 | A1 | 2/2012 | Grisenthwaite |
| 2012/0089807 | A1 * | 4/2012 | Rupley ......................... 711/203 |

FOREIGN PATENT DOCUMENTS

| | | |
|---|---|---|
| JP | 61-122743 U | 8/1986 |
| KR | 2007-0071466 | 7/2007 |
| WO | WO 95/32466 | 11/1995 |
| WO | WO 99/08185 | 2/1999 |

* cited by examiner

Common Format ⟷ Row Specifier [6:2]  Bank Specifier [1:0]  [size] ⟷ qNN[B][size]

FIG. 4

|  | bank3 | bank2 | bank1 | bank0 |  | bank3 | bank2 | bank1 | bank0 |
|---|---|---|---|---|---|---|---|---|---|
| row 31 |  |  |  |  | row 31 |  |  |  |  |
| row 30 |  |  |  |  | row 30 |  |  |  |  |
| row 29 |  |  |  |  | row 29 |  |  |  |  |
| row 28 |  |  |  |  | row 28 |  |  |  |  |
| row 27 |  |  |  |  | row 27 |  |  |  |  |
| row 26 |  |  |  |  | row 26 |  |  |  |  |
| row 25 |  |  |  |  | row 25 |  |  |  |  |
| row 24 |  |  |  |  | row 24 |  |  |  |  |
| row 23 |  |  |  |  | row 23 |  |  |  |  |
| row 22 |  |  |  |  | row 22 |  |  |  |  |
| row 21 |  |  |  |  | row 21 |  |  |  |  |
| row 20 |  |  |  |  | row 20 |  |  |  |  |
| row 19 |  |  |  |  | row 19 |  |  |  |  |
| row 18 |  |  |  |  | row 18 |  |  |  |  |
| row 17 |  |  |  |  | row 17 |  |  |  |  |
| row 16 |  |  |  |  | row 16 |  |  |  |  |
| row 15 | D31 |  | D30 |  | row 15 | q15[3:2] |  | q15[1:0] |  |
| row 14 | D29 |  | D28 |  | row 14 | q14[3:2] |  | q14[1:0] |  |
| row 13 | D27 |  | D26 |  | row 13 | q13[3:2] |  | q13[1:0] |  |
| row 12 | D25 |  | D24 |  | row 12 | q12[3:2] |  | q12[1:0] |  |
| row 11 | D23 |  | D22 |  | row 11 | q11[3:2] |  | q11[1:0] |  |
| row 10 | D21 |  | D20 |  | row 10 | q10[3:2] |  | q10[1:0] |  |
| row 09 | D19 |  | D18 |  | row 09 | q09[3:2] |  | q09[1:0] |  |
| row 08 | D17 |  | D16 |  | row 08 | q08[3:2] |  | q08[1:0] |  |
| row 07 | D15 |  | D14 |  | row 07 | q07[3:2] |  | q07[1:0] |  |
| row 06 | D13 |  | D12 |  | row 06 | q06[3:2] |  | q06[1:0] |  |
| row 05 | D11 |  | D10 |  | row 05 | q05[3:2] |  | q05[1:0] |  |
| row 04 | D09 |  | D08 |  | row 04 | q04[3:2] |  | q04[1:0] |  |
| row 03 | D07 |  | D06 |  | row 03 | q03[3:2] |  | q03[1:0] |  |
| row 02 | D05 |  | D04 |  | row 02 | q02[3:2] |  | q02[1:0] |  |
| row 01 | D03 |  | D02 |  | row 01 | q01[3:2] |  | q01[1:0] |  |
| row 00 | D01 |  | D00 |  | row 00 | q00[3:2] |  | q00[1:0] |  |

First Mapping - Double Word

FIG. 5A

| | bank3 | bank2 | bank1 | bank0 | | bank3 | bank2 | bank1 | bank0 |
|---|---|---|---|---|---|---|---|---|---|
| row 31 | | | | | row 31 | | | | |
| row 30 | | | | | row 30 | | | | |
| row 29 | | | | | row 29 | | | | |
| row 28 | | | | | row 28 | | | | |
| row 27 | | | | | row 27 | | | | |
| row 26 | | | | | row 26 | | | | |
| row 25 | | | | | row 25 | | | | |
| row 24 | | | | | row 24 | | | | |
| row 23 | | | | | row 23 | | | | |
| row 22 | | | | | row 22 | | | | |
| row 21 | | | | | row 21 | | | | |
| row 20 | | | | | row 20 | | | | |
| row 19 | | | | | row 19 | | | | |
| row 18 | | | | | row 18 | | | | |
| row 17 | | | | | row 17 | | | | |
| row 16 | | | | | row 16 | | | | |
| row 15 | S63 | S62 | S61 | S60 | row 15 | q15[3] | q15[2] | q15[1] | q15[0] |
| row 14 | S59 | S58 | S57 | S56 | row 14 | q14[3] | q14[2] | q14[1] | q14[0] |
| row 13 | S55 | S54 | S53 | S52 | row 13 | q13[3] | q13[2] | q13[1] | q13[0] |
| row 12 | S51 | S50 | S49 | S48 | row 12 | q12[3] | q12[2] | q12[1] | q12[0] |
| row 11 | S47 | S46 | S45 | S44 | row 11 | q11[3] | q11[2] | q11[1] | q11[0] |
| row 10 | S43 | S42 | S41 | S40 | row 10 | q10[3] | q10[2] | q10[1] | q10[0] |
| row 09 | S39 | S38 | S37 | S36 | row 09 | q09[3] | q09[2] | q09[1] | q09[0] |
| row 08 | S35 | S34 | S33 | S32 | row 08 | q08[3] | q08[2] | q08[1] | q08[0] |
| row 07 | S31 | S30 | S29 | S28 | row 07 | q07[3] | q07[2] | q07[1] | q07[0] |
| row 06 | S27 | S26 | S25 | S24 | row 06 | q06[3] | q06[2] | q06[1] | q06[0] |
| row 05 | S23 | S22 | S21 | S20 | row 05 | q05[3] | q05[2] | q05[1] | q05[0] |
| row 04 | S19 | S18 | S17 | S16 | row 04 | q04[3] | q04[2] | q04[1] | q04[0] |
| row 03 | S15 | S14 | S13 | S12 | row 03 | q03[3] | q03[2] | q03[1] | q03[0] |
| row 02 | S11 | S10 | S09 | S08 | row 02 | q02[3] | q02[2] | q02[1] | q02[0] |
| row 01 | S07 | S06 | S05 | S04 | row 01 | q01[3] | q01[2] | q01[1] | q01[0] |
| row 00 | S03 | S02 | S01 | S00 | row 00 | q00[3] | q00[2] | q00[1] | q00[0] |

First Mapping - Single Word

FIG. 5B

| row | | row | |
|---|---|---|---|
| row 31 | | row 31 | |
| row 30 | | row 30 | |
| row 29 | | row 29 | |
| row 28 | | row 28 | |
| row 27 | | row 27 | |
| row 26 | | row 26 | |
| row 25 | | row 25 | |
| row 24 | | row 24 | |
| row 23 | | row 23 | |
| row 22 | | row 22 | |
| row 21 | | row 21 | |
| row 20 | | row 20 | |
| row 19 | | row 19 | |
| row 18 | | row 18 | |
| row 17 | | row 17 | |
| row 16 | | row 16 | |
| row 15 | Q15 | row 15 | q15[3:0] |
| row 14 | Q14 | row 14 | q14[3:0] |
| row 13 | Q13 | row 13 | q13[3:0] |
| row 12 | Q12 | row 12 | q12[3:0] |
| row 11 | Q11 | row 11 | q11[3:0] |
| row 10 | Q10 | row 10 | q10[3:0] |
| row 09 | Q09 | row 09 | q09[3:0] |
| row 08 | Q08 | row 08 | q08[3:0] |
| row 07 | Q07 | row 07 | q07[3:0] |
| row 06 | Q06 | row 06 | q06[3:0] |
| row 05 | Q05 | row 05 | q05[3:0] |
| row 04 | Q04 | row 04 | q04[3:0] |
| row 03 | Q03 | row 03 | q03[3:0] |
| row 02 | Q02 | row 02 | q02[3:0] |
| row 01 | Q01 | row 01 | q01[3:0] |
| row 00 | Q00 | row 00 | q00[3:0] |

First Mapping - Quad Word

FIG. 5C

| | bank3 | bank2 | bank1 | bank0 | | bank3 | bank2 | bank1 | bank0 |
|---|---|---|---|---|---|---|---|---|---|
| row 31 | | | | D31 | row 31 | q31[3:2] | | q31[1:0] | |
| row 30 | | | | D30 | row 30 | q30[3:2] | | q30[1:0] | |
| row 29 | | | | D29 | row 29 | q29[3:2] | | q29[1:0] | |
| row 28 | | | | D28 | row 28 | q28[3:2] | | q28[1:0] | |
| row 27 | | | | D27 | row 27 | q27[3:2] | | q27[1:0] | |
| row 26 | | | | D26 | row 26 | q26[3:2] | | q26[1:0] | |
| row 25 | | | | D25 | row 25 | q25[3:2] | | q25[1:0] | |
| row 24 | | | | D24 | row 24 | q24[3:2] | | q24[1:0] | |
| row 23 | | | | D23 | row 23 | q23[3:2] | | q23[1:0] | |
| row 22 | | | | D22 | row 22 | q22[3:2] | | q22[1:0] | |
| row 21 | | | | D21 | row 21 | q21[3:2] | | q21[1:0] | |
| row 20 | | | | D20 | row 20 | q20[3:2] | | q20[1:0] | |
| row 19 | | | | D19 | row 19 | q19[3:2] | | q19[1:0] | |
| row 18 | | | | D18 | row 18 | q18[3:2] | | q18[1:0] | |
| row 17 | | | | D17 | row 17 | q17[3:2] | | q17[1:0] | |
| row 16 | | | | D16 | row 16 | q16[3:2] | | q16[1:0] | |
| row 15 | | | | D15 | row 15 | q15[3:2] | | q15[1:0] | |
| row 14 | | | | D14 | row 14 | q14[3:2] | | q14[1:0] | |
| row 13 | | | | D13 | row 13 | q13[3:2] | | q13[1:0] | |
| row 12 | | | | D12 | row 12 | q12[3:2] | | q12[1:0] | |
| row 11 | | | | D11 | row 11 | q11[3:2] | | q11[1:0] | |
| row 10 | | | | D10 | row 10 | q10[3:2] | | q10[1:0] | |
| row 09 | | | | D09 | row 09 | q09[3:2] | | q09[1:0] | |
| row 08 | | | | D08 | row 08 | q08[3:2] | | q08[1:0] | |
| row 07 | | | | D07 | row 07 | q07[3:2] | | q07[1:0] | |
| row 06 | | | | D06 | row 06 | q06[3:2] | | q06[1:0] | |
| row 05 | | | | D05 | row 05 | q05[3:2] | | q05[1:0] | |
| row 04 | | | | D04 | row 04 | q04[3:2] | | q04[1:0] | |
| row 03 | | | | D03 | row 03 | q03[3:2] | | q03[1:0] | |
| row 02 | | | | D02 | row 02 | q02[3:2] | | q02[1:0] | |
| row 01 | | | | D01 | row 01 | q01[3:2] | | q01[1:0] | |
| row 00 | | | | D00 | row 00 | q00[3:2] | | q00[1:0] | |

Second Mapping - Double Word

FIG. 6A

|  | bank3 | bank2 | bank1 | bank0 |  | bank3 | bank2 | bank1 | bank0 |
|---|---|---|---|---|---|---|---|---|---|
| row 31 |  |  |  | S31 | row 31 | q31[3] | q31[2] | q31[1] | q31[0] |
| row 30 |  |  |  | S30 | row 30 | q30[3] | q30[2] | q30[1] | q30[0] |
| row 29 |  |  |  | S29 | row 29 | q29[3] | q29[2] | q29[1] | q29[0] |
| row 28 |  |  |  | S28 | row 28 | q28[3] | q28[2] | q28[1] | q28[0] |
| row 27 |  |  |  | S27 | row 27 | q27[3] | q27[2] | q27[1] | q27[0] |
| row 26 |  |  |  | S26 | row 26 | q26[3] | q26[2] | q26[1] | q26[0] |
| row 25 |  |  |  | S25 | row 25 | q25[3] | q25[2] | q25[1] | q25[0] |
| row 24 |  |  |  | S24 | row 24 | q24[3] | q24[2] | q24[1] | q24[0] |
| row 23 |  |  |  | S23 | row 23 | q23[3] | q23[2] | q23[1] | q23[0] |
| row 22 |  |  |  | S22 | row 22 | q22[3] | q22[2] | q22[1] | q22[0] |
| row 21 |  |  |  | S21 | row 21 | q21[3] | q21[2] | q21[1] | q21[0] |
| row 20 |  |  |  | S20 | row 20 | q20[3] | q20[2] | q20[1] | q20[0] |
| row 19 |  |  |  | S19 | row 19 | q19[3] | q19[2] | q19[1] | q19[0] |
| row 18 |  |  |  | S18 | row 18 | q18[3] | q18[2] | q18[1] | q18[0] |
| row 17 |  |  |  | S17 | row 17 | q17[3] | q17[2] | q17[1] | q17[0] |
| row 16 |  |  |  | S16 | row 16 | q16[3] | q16[2] | q16[1] | q16[0] |
| row 15 |  |  |  | S15 | row 15 | q15[3] | q15[2] | q15[1] | q15[0] |
| row 14 |  |  |  | S14 | row 14 | q14[3] | q14[2] | q14[1] | q14[0] |
| row 13 |  |  |  | S13 | row 13 | q13[3] | q13[2] | q13[1] | q13[0] |
| row 12 |  |  |  | S12 | row 12 | q12[3] | q12[2] | q12[1] | q12[0] |
| row 11 |  |  |  | S11 | row 11 | q11[3] | q11[2] | q11[1] | q11[0] |
| row 10 |  |  |  | S10 | row 10 | q10[3] | q10[2] | q10[1] | q10[0] |
| row 09 |  |  |  | S09 | row 09 | q09[3] | q09[2] | q09[1] | q09[0] |
| row 08 |  |  |  | S08 | row 08 | q08[3] | q08[2] | q08[1] | q08[0] |
| row 07 |  |  |  | S07 | row 07 | q07[3] | q07[2] | q07[1] | q07[0] |
| row 06 |  |  |  | S06 | row 06 | q06[3] | q06[2] | q06[1] | q06[0] |
| row 05 |  |  |  | S05 | row 05 | q05[3] | q05[2] | q05[1] | q05[0] |
| row 04 |  |  |  | S04 | row 04 | q04[3] | q04[2] | q04[1] | q04[0] |
| row 03 |  |  |  | S03 | row 03 | q03[3] | q03[2] | q03[1] | q03[0] |
| row 02 |  |  |  | S02 | row 02 | q02[3] | q02[2] | q02[1] | q02[0] |
| row 01 |  |  |  | S01 | row 01 | q01[3] | q01[2] | q01[1] | q01[0] |
| row 00 |  |  |  | S00 | row 00 | q00[3] | q00[2] | q00[1] | q00[0] |

Second Mapping - Single Word

FIG. 6B

| | bank3 bank2 bank1 bank0 | | |
|---|---|---|---|
| row 31 | Q31 | row 31 | q31[3:0] |
| row 30 | Q30 | row 30 | q30[3:0] |
| row 29 | Q29 | row 29 | q29[3:0] |
| row 28 | Q28 | row 28 | q28[3:0] |
| row 27 | Q27 | row 27 | q27[3:0] |
| row 26 | Q26 | row 26 | q26[3:0] |
| row 25 | Q25 | row 25 | q25[3:0] |
| row 24 | Q24 | row 24 | q24[3:0] |
| row 23 | Q23 | row 23 | q23[3:0] |
| row 22 | Q22 | row 22 | q22[3:0] |
| row 21 | Q21 | row 21 | q21[3:0] |
| row 20 | Q20 | row 20 | q20[3:0] |
| row 19 | Q19 | row 19 | q19[3:0] |
| row 18 | Q18 | row 18 | q18[3:0] |
| row 17 | Q17 | row 17 | q17[3:0] |
| row 16 | Q16 | row 16 | q16[3:0] |
| row 15 | Q15 | row 15 | q15[3:0] |
| row 14 | Q14 | row 14 | q14[3:0] |
| row 13 | Q13 | row 13 | q13[3:0] |
| row 12 | Q12 | row 12 | q12[3:0] |
| row 11 | Q11 | row 11 | q11[3:0] |
| row 10 | Q10 | row 10 | q10[3:0] |
| row 09 | Q09 | row 09 | q09[3:0] |
| row 08 | Q08 | row 08 | q08[3:0] |
| row 07 | Q07 | row 07 | q07[3:0] |
| row 06 | Q06 | row 06 | q06[3:0] |
| row 05 | Q05 | row 05 | q05[3:0] |
| row 04 | Q04 | row 04 | q04[3:0] |
| row 03 | Q03 | row 03 | q03[3:0] |
| row 02 | Q02 | row 02 | q02[3:0] |
| row 01 | Q01 | row 01 | q01[3:0] |
| row 00 | Q00 | row 00 | q00[3:0] |

Second Mapping - Quad Word

MAPPING SAME LOGICAL REGISTER SPECIFIER FOR DIFFERENT INSTRUCTION SETS WITH DIVERGENT ASSOCIATION TO ARCHITECTURAL REGISTER FILE USING COMMON ADDRESS FORMAT

BACKGROUND OF THE INVENTION

1. Field of the Invention

This invention relates to the field of data processing systems. More particularly, this invention relates to the field of data processing systems supporting multiple different instruction sets.

2. Description of the Prior Art

It is known to provide data processing systems supporting multiple instruction sets. For example, known processes designed by ARM Limited of Cambridge, England support both the ARM and the Thumb instruction sets. These instruction sets share a register file and share a mapping between register specifiers and registers within that register file.

The ARM and Thumb instruction sets referred to above are closely related and accordingly it is possible for the same mapping to be used between register specifiers and architectural registers storing operands. However, it may be desirable to support instruction set architectures with a significant degree of difference between the ways in which architectural registers are addressed by program instructions of those different instruction sets. One way of dealing with this is to provide separate mechanisms for the register addressing to be used by the instructions from the different instruction set. However, this disadvantageously increases the required circuit resources and power consumption.

SUMMARY OF THE INVENTION

Viewed from one aspect the present invention provides an apparatus for processing data comprising:

processing circuitry configured to perform processing operations;

an architectural register file having a plurality of architectural registers for storing operand values;

first decoder circuitry configured to decode program instructions of a first instruction set to generate control signals for controlling said processing circuitry to perform processing operations; and second decoder circuitry configured to decode program instructions of a second instruction set to generate control signals for controlling said processing circuitry to perform processing operations; wherein program instructions of said first instruction set include first logical register specifiers specifying first logical registers holding operand values, said first logical registers corresponding to architectural registers within said architectural register file and having a plurality of different sizes corresponding to different numbers of words of data up to a maximum number of words of data;

program instructions of said second instruction set include second logical register specifiers specifying second logical registers holding operand values, said second logical registers corresponding to architectural registers within said architectural register file and having a plurality of different sizes corresponding to different numbers of words of data up to said maximum number of words of data;

said first decoder circuitry is configured to map said first logical specifiers using a first mapping to a common address format;

said second decoder circuitry is configured to map said second logical specifiers using a second mapping to said common address format; and said second mapping is divergent from said first mapping such that at least some values used as both a first logical register specifier and a second logical register specifier map to different architectural registers.

The present invention recognises that the first decoder's circuitry and the second decoder's circuitry used to decode program instructions of respective instruction sets may be configured to map their register specifiers to a common address format despite the divergence between them in which some values used as both first logical register specifiers and second logical register specifiers are mapped to different architectural registers. The resolving of the different mappings into a common address format permits a common (shared) set of subsequent circuitry to be used for the processing of register specifiers using that common address format thereby permitting a reduction in circuit overhead and power consumption.

In some embodiments the architectural registers may be addressed as an array of architectural registers arranged as a plurality of banks and a plurality of rows with the common addressed format comprising a bank specifier and a row specifier within the array. In this way, the bank specifier and the row specifier may be viewed as Cartesian coordinates for addressing a particular architectural register within an array of architectural registers.

In some embodiments the plurality of banks permit first logical registers and second logical registers having the maximum number of words to be stored within a single row of the array. Storing operands of the maximum size within a single row facilitates the use of single port access to the register file thereby reducing circuit overhead and complexity.

The first mapping and the second mapping may take a variety of different forms. In some embodiments one of the first logical registers of the maximum number of words corresponds to a group of architectural register that are all mapped by the first mapping to a plurality of logical registers at each different lower size. Thus, for example, a single quad word register may correspond to two double word registers and four single word registers.

Either in combination with the above, or separate therefrom, the second mapping may be such that one of the second logical registers of the maximum number of words corresponds to a group of architectural registers at least one of which is mapped by the second mapping to a single second logical register at each different lower size. Thus, a quad word register corresponds to a single double word register (with some excess space) and a single single word register (with some excess space).

Within embodiments utilizing register naming there may be provided a plurality of physical registers configured to store data values to be manipulated and renaming circuitry configured to store register mapping data mapping between a bank specifier value and a row specifier value identifying an architectural register and one of the physical registers to be used in place of the architectural register for speculative execution of a program instruction. Thus, the common register addressing format may be used as an input to common renaming circuitry.

In circumstances where a plurality of architectural registers correspond to one of the first logical register or the second logical register, energy may be saved by identifying the plurality of architectural registers using a single architectural register value in the common address format and a size qualifier to indicate how many of the architectural registers are combined with the one specified in the single architectural register value.

Viewed from another aspect present invention provides an apparatus for processing data comprising:

processing means for performing processing operations;

a plurality of architectural register means for storing operand values;

first decoder means for decoding program instructions of a first instruction set to generate control signals for controlling said processing means to perform processing operations; and second decoder means for decoding program instructions of a second instruction set to generate control signals for controlling said processing means to perform processing operations; wherein program instructions of said first instruction set include first logical register specifiers specifying first logical register means for holding operand values, said first logical register means corresponding to architectural register means and having a plurality of different sizes corresponding to different numbers of words of data up to a maximum number of words of data;

program instructions of said second instruction set include second logical register specifiers specifying second logical register means for holding operand values, said second logical register means corresponding to architectural register means and having a plurality of different sizes corresponding to different numbers of words of data up to said maximum number of words of data;

said first decoder means maps said first logical specifiers using a first mapping to a common address format;

said second decoder means maps said second logical specifiers using a second mapping to said common address format; and said second mapping is divergent from said first mapping such that at least some values used as both a first logical register specifier and a second logical register specifier map to different architectural register means.

Viewed from a further aspect the invention provides a method of processing data comprising the steps of:

performing processing operations with processing circuitry;

storing operand values in a plurality of architectural registers of an architectural register file;

decoding program instructions of a first instruction set to generate control signals for controlling said processing circuitry to perform processing operations; and decoding program instructions of a second instruction set to generate control signals for controlling said processing circuitry to perform processing operations; wherein program instructions of said first instruction set include first logical register specifiers specifying first logical registers holding operand values, said first logical registers corresponding to architectural registers within said architectural register file and having a plurality of different sizes corresponding to different numbers of words of data up to a maximum number of words of data;

program instructions of said second instruction set include second logical register specifiers specifying second logical registers holding operand values, said second logical registers corresponding to architectural registers within said architectural register file and having a plurality of different sizes corresponding to different numbers of words of data up to said maximum number of words of data; further comprising the steps of:

using a first mapping to map said first logical specifiers to a common address format; and using a second mapping to map said second logical specifiers to said common address format; wherein said second mapping is divergent from said first mapping such that at least some values used as both a first logical register specifier and a second logical register specifier map to different architectural registers.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 6A, 6B and 6C schematically illustrate a second register mapping: and

DESCRIPTION OF THE EMBODIMENTS

Figure 1:
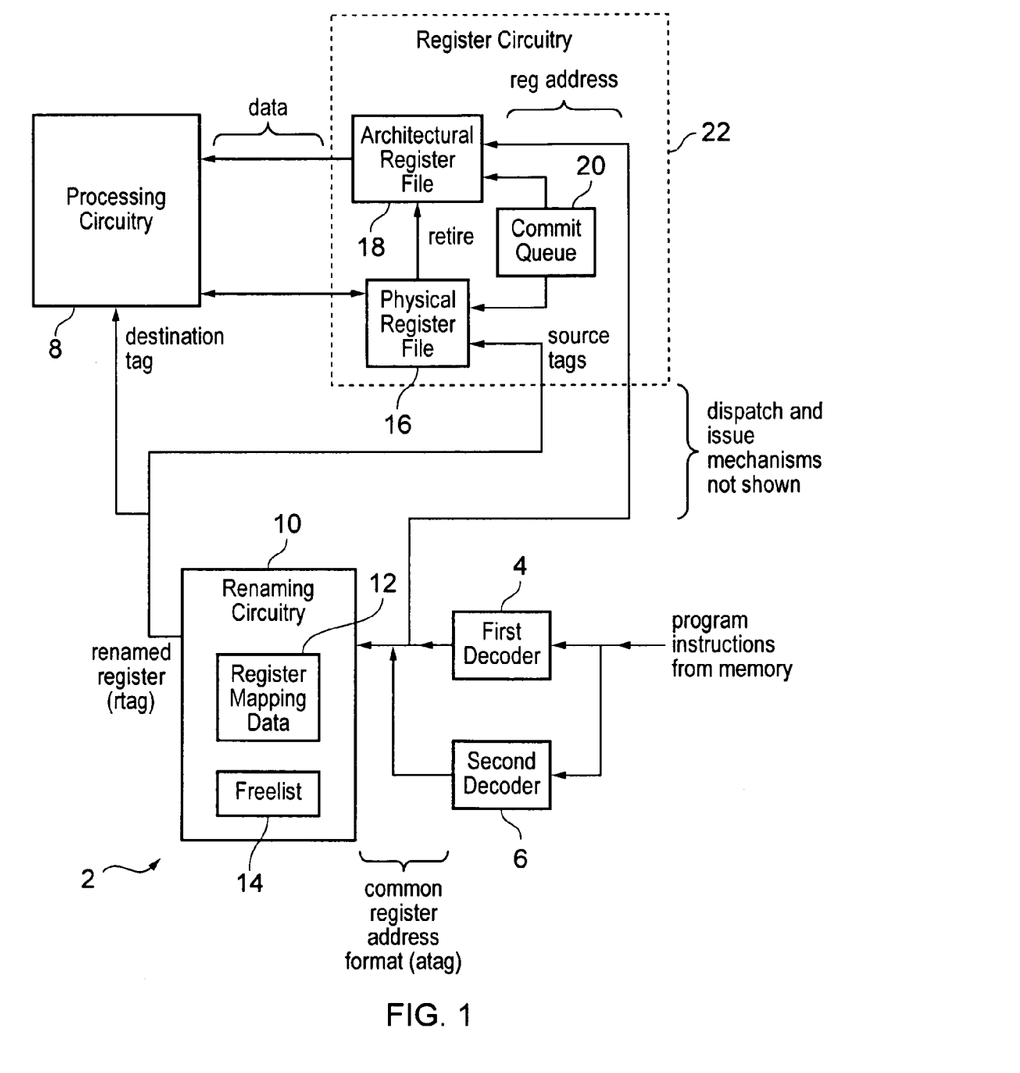
FIG. 1 schematically illustrates a data processing apparatus including decoding circuitry, renaming circuitry, register circuitry and processing circuitry.

FIG. 1 schematically illustrates a portion 2 of a data processing apparatus. The data processing apparatus may be a processor core supporting out-of-order program instruction execution. It will be appreciated that such a processor core will typically contain many more circuit elements that are illustrated in FIG. 1. These additional circuit elements have been omitted from FIG. 1 for the sake of clarity.

The circuitry of FIG. 1 includes first decoder circuitry 4 and second decoder circuitry 6 which receive program instruction from a memory (not illustrated) and decode these instruction using respectively a first mapping and a second mapping to produce register specifiers having a common register address format (atag).

It will be appreciated that the first decoder circuitry 4 and second decoder circuitry 6 will typically produce many other outputs, such as control signals for controlling other aspects of the processor core, such as the processing circuitry 8 which performs the processing operations specified by the program instruction.

The common register address format register specifiers output by the first decoder 4 and the second decoder 6 are supplied to renaming circuitry 10 which includes register mapping data 12 and a free list 14. The renaming circuitry 10 applies register renaming techniques, as typically used in out-of-order processors, to generate a renamed register specifier (rtag). This renamed register specifier is supplied to a physical register file 16 which together with an architectural register file 18 and commit queue 20 form part of register circuitry 22. The physical registers in the physical register files 16 are used for storing speculative operands. When these operands become non-speculative, the commit queue circuitry 20 manages their writing (retirement) into the architectural register file 18. The register mapping data 12 tracks which architectural registers are mapped to which physical registers. The free list 14 tracks which physical registers are available for allocation to store speculative operand values in accordance with register renaming techniques.

The renamed register specifiers produced by the renaming circuitry 10 also include the destination tag identifying the destination physical register for a program instruction. When an architectural register is not currently mapped to any physical register, the common register address format register specifier may be used by the architectural register file 18 to supply the required operand to the processing circuitry 8.

It will be appreciated by those familiar with this technical field that the portion of the processor shown in FIG. 1 may additionally include dispatch and issue mechanisms disposed between the renaming circuitry and the processing circuitry and the register circuitry. These dispatch and issue mechanisms will receive the renamed register specifiers and the common register address format register specifiers and pass these forward to the processing circuitry 8 and the register circuitry 22.

Figure 2:
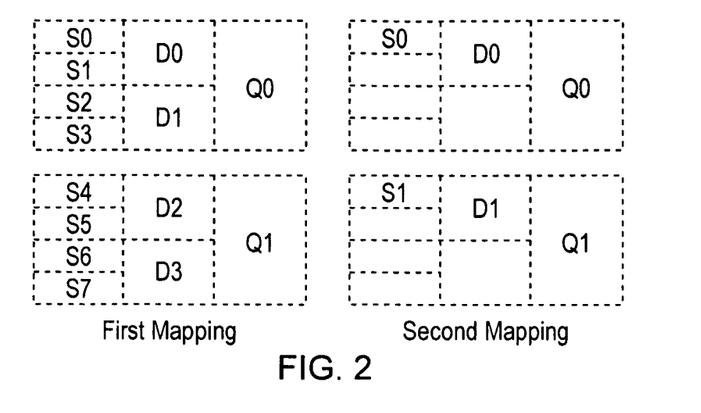
FIG. 2 schematically illustrates a first mapping between logical register specifiers and architectural registers and a second mapping between logical register specifiers and architectural registers.

FIG. 2 schematically illustrates a first mapping and a second mapping between logical register specifiers and architectural registers within the architectural register file 18. The three columns for each mapping represent the same addressable entity accessed with different register widths. In the case of the first mapping, a single quad word logical register is stored within four architectural registers. These four architectural registers may also be addressed using two logical register specifiers for double word operands or four logical register specifiers for single word operands as illustrated.

The correspondence between the elements within the columns is such that S1 in the first mapping corresponds to the block immediately below S0 in the second mapping. The same position within the diagrams showing the first and second mappings corresponds to the same physical register storage locations—for example S2 in the first mapping corresponds to the block S0 in the first mapping and S4 from the first mapping corresponds to S1 in the second mapping as shown in FIGS. 5B and 6B discussed below.

In accordance with the second mapping a logical register specifier for a quad word operand again corresponds to four architectural registers. However, in this case these four architectural registers may be used to store either a single double word logical register or a single single word logical register. These two mappings are divergent in that it will be seen that a single value of a logical register specifier (as specified by a program instruction) such as "S1" maps to different architectural registers when subject to the first mapping compared to when subject to the second mapping.

Figure 3:
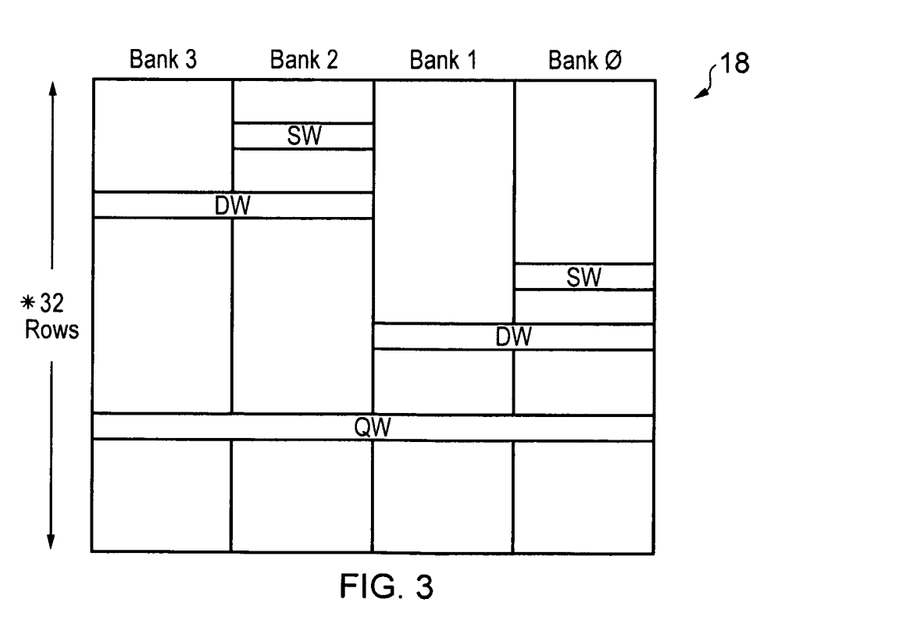
FIG. 3 schematically illustrates an architectural register file containing registers of different sizes.

FIG. 3 schematically illustrates the architectural register file 18. The architectural register file is composed of four banks of architectural registers with each of these banks containing 32 architectural registers. Thus, the architectural register file 18 comprises an array of registers including four banks and 32 rows. An individual architectural register within the architectural register file may be addressed using a 2-bit bank specifier and a 5-bit row specifier. In practice, if the register being addressed is greater in size than a single architectural register, then it may be specified using a single row specifier and bank specifier value together with a size field indicating how many architectural registers together form the logical register being manipulated.

FIG. 3 shows how the architectural register file may contain a mixture of quad word operands, double word operands and single word operands stored within respective architectural registers.

Figure 4:
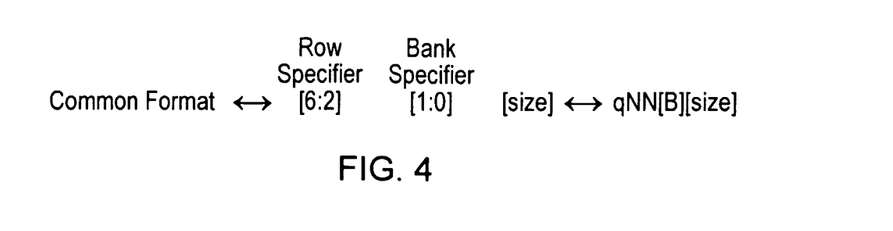
FIG. 4 schematically illustrates a common register address format.

FIG. 4 illustrates the common register addressing format generated by the first decoder 4 and the second decoder 6. This common register addressing format comprises 5-bits of row specifier, 2-bits of bank specifier and a field specifying the size of the register in terms of the number of architectural registers it comprises in total. Another way to consider this common register addressing format is that each row within the architectural register file 18 comprises a quad word with the individual registers being addressed by the bank specifier and the size indicating the number of architectural registers treated together as storing that logical register value. Double word registers are even aligned within the architectural register file 18.

The general format of the register specifiers illustrated in FIGS. 5A, 5B, 5C, 6A, 6B and 6C is that in the left hand illustration the logical specifier is given and in the right hand illustration the common register address format is given.

Figure 5A:
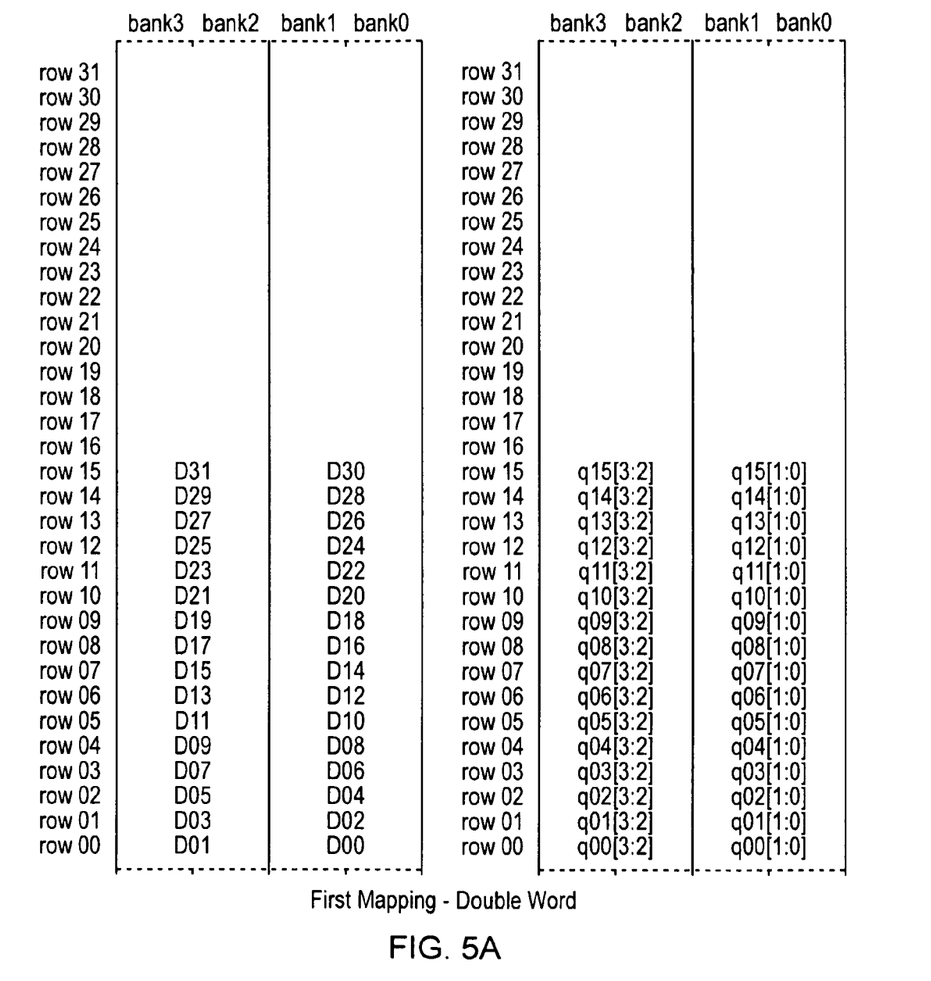
FIGS. 5A, 5B and 5C schematically illustrate a first register mapping.
Figure 5B:
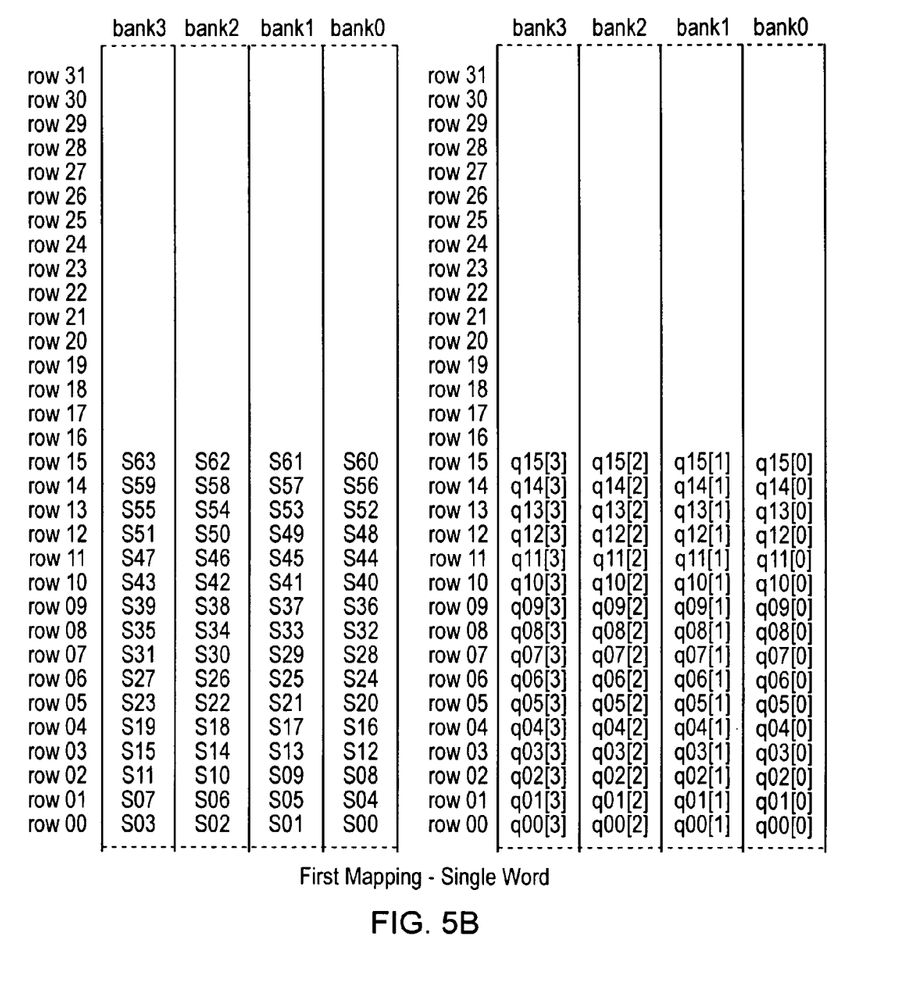
Figure 5C:
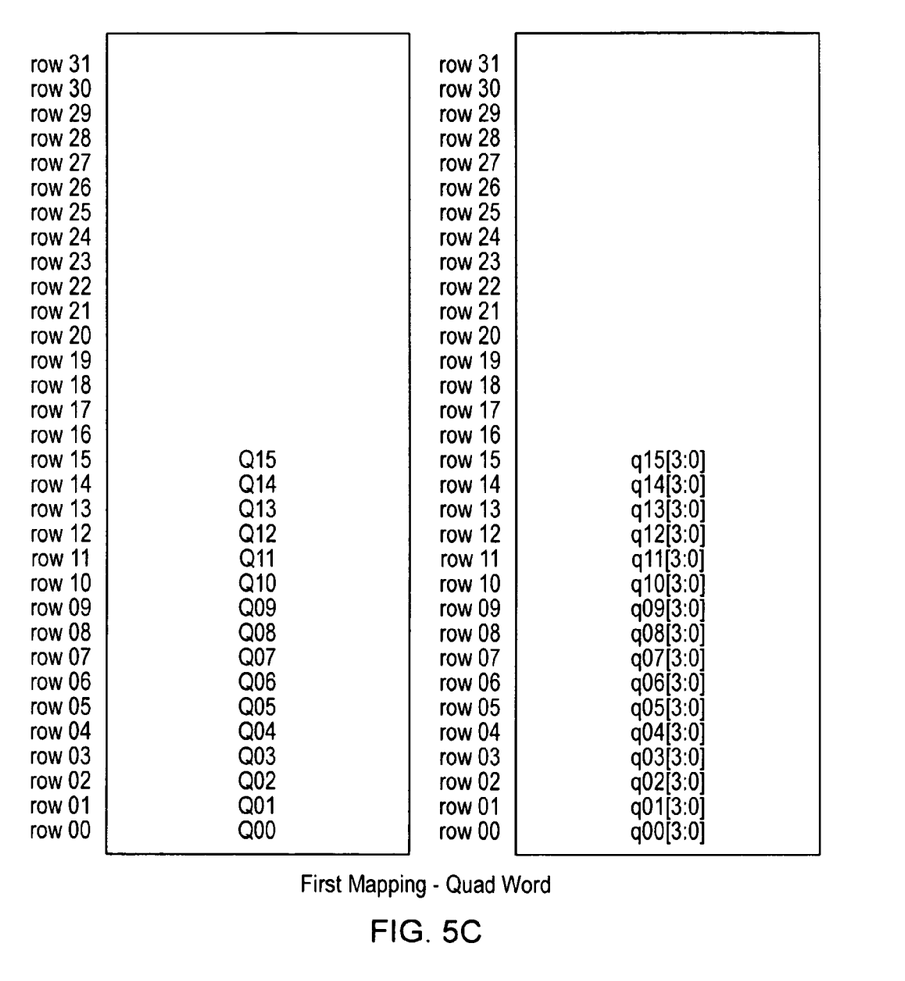

FIGS. 5A, 5B and 5C illustrate in more detail the first example mapping used respectively for double word registers, single word registers and quad word registers. The double word registers are even aligned and each corresponds to two architectural registers within one of the rows of the architectural register file 18. The single word registers are not constrained to odd or even alignment and each corresponds to a single architectural register within one of the rows of the array. The quad word registers are aligned such that each corresponds to a complete row within the architectural file array. Thus, a single write port may be used to write a full quad word operand into the array and a single read port used to read a full quad word operand from the array.

Figure 6A:
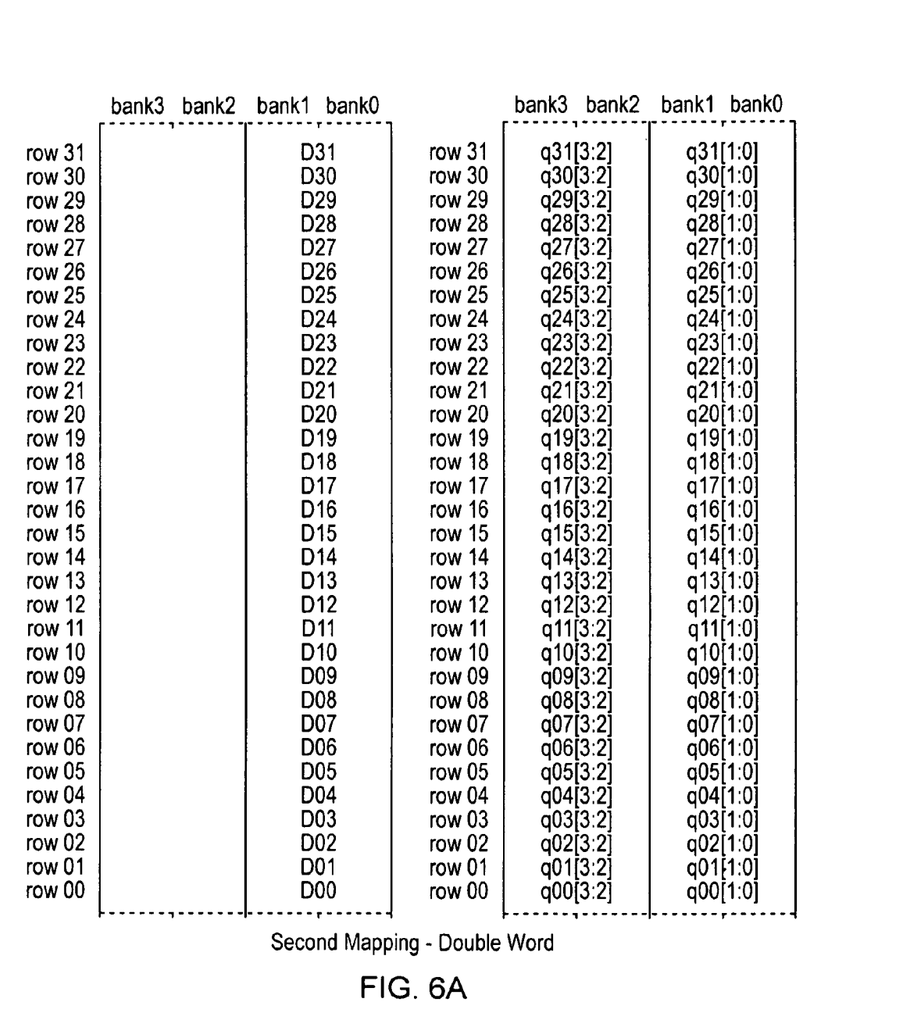
Figure 6C:
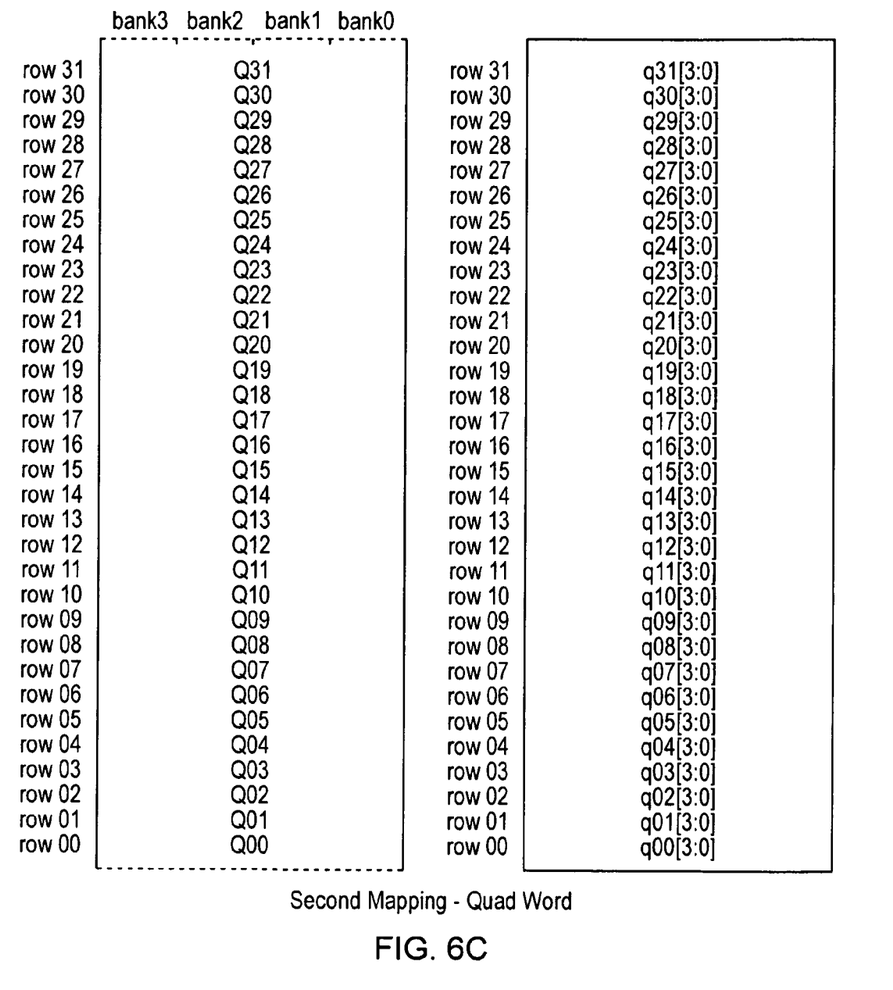

FIGS. 6A, 6B and 6C respectively indicate the second example mapping used for double word registers, single word registers and quad word registers. The double word registers of the logical register specifiers of the second instruction set only map to bank0 and bank1. Other instructions may be provided which will provide access to the other architectural registers within bank2 and bank3. These will not however be directly accessible using double word logical register specifiers as employed by the program instructions of the second instruction set.

FIG. 6B illustrates the second mapping used for single word registers. All of the logical specifiers for the single word registers are mapped to the architectural registers within bank0. Again, the architectural registers in the other banks may be accessed by other instructions but not directly used in single word logical register specifiers.

The second mapping used for quad word registers is such that each logical register specifier corresponds to a row within the array.

Figure 7:
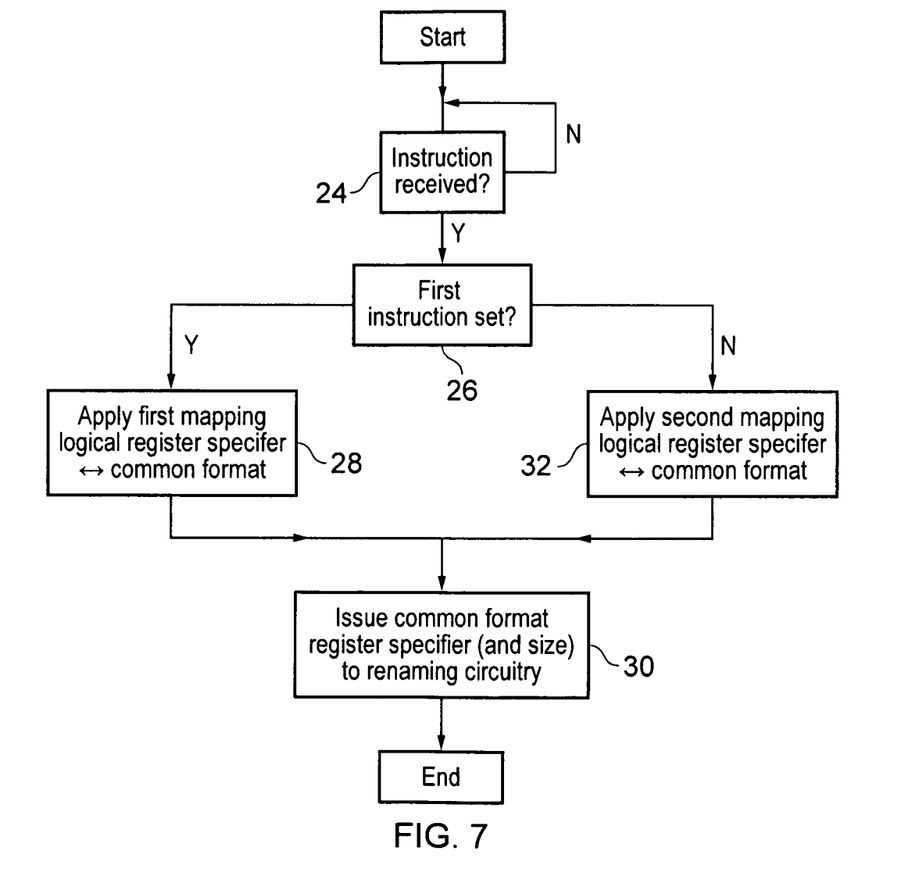
FIG. 7 is a flow diagram and schematically illustrating how logical register specifiers may be mapped to a common format using either a first mapping or a second mapping.

FIG. 7 schematically illustrates a flow diagram of how a logical register specifier may be mapped to a common format register specifier. It will be appreciated that the flow diagram of FIG. 7 is a representation of what may be considered logically to take place but in practice the hardware used to implement such behaviour may operate in a different manor with a different sequence of events.

At step 24, processing waits until an instruction is received. Step 26 determines whether or not that instruction is from the first instruction set. If the instruction is from the first instruction set, then step 28 applies a first mapping (see FIGS. 5A, 5B and 5C) to form a common register addressing format register specifier. Processing then proceeds to step 30 where the common format register specifier (including the size indicating the number of architectural registers concerned) is issued to the renaming circuitry 10.

If the determination at step 26 is that the instruction received is not from the first instruction set, then the instruction will be from the second instruction set and processing proceeds to step 32 at which the second mapping is applied between the logical register specifier and the common format register specifier (see FIGS. 6A, 6B and 6C). Processing again proceeds subsequent to this mapping to step 30.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims

We claim:

1. Apparatus for processing data comprising:
   processing circuitry configured to perform processing operations;
   an architectural register file having a plurality of architectural registers for storing operand values;
   first decoder circuitry configured to decode program instructions of a first instruction set to generate control signals for controlling said processing circuitry to perform processing operations; and
   second decoder circuitry configured to decode program instructions of a second instruction set to generate control signals for controlling said processing circuitry to perform processing operations; wherein
   program instructions of said first instruction set include first logical register specifiers specifying first logical registers holding operand values, said first logical registers corresponding to architectural registers within said architectural register file and having a plurality of different sizes corresponding to different numbers of words of data up to a maximum number of words of data;
   program instructions of said second instruction set include second logical register specifiers specifying second logical registers holding operand values, said second logical registers corresponding to architectural registers within said architectural register file and having a plurality of different sizes corresponding to different numbers of words of data up to said maximum number of words of data;
   said first decoder circuitry is configured to map said first logical specifiers using a first mapping to a common address format;
   said second decoder circuitry is configured to map said second logical specifiers using a second mapping to said common address format; and
   said second mapping is divergent from said first mapping wherein at least some values used as both a first logical register specifier and a second logical register specifier map to different architectural registers.

2. Apparatus as claimed in claim 1, wherein said plurality of architectural register are addressed as an array of architectural registers arranged in a plurality of banks and a plurality of rows and said common address format comprises a bank specifier and a row specifier within said array.

3. Apparatus as claimed in claim 1, wherein said plurality of banks permit first logical registers and second logical registers having said maximum number of words to be stored in a single row of said array.

4. Apparatus as claimed in claim 1, wherein one of said first logical registers of said maximum number of words corresponds to a group of architectural registers that are all mapped by said first mapping to a plurality of first logical registers at each different lower size.

5. Apparatus as claimed in claim 1, wherein one of said second logical registers of said maximum number of words corresponds to a group of architectural registers that at least one of which is mapped by said second mapping to a single second logical register at each different lower size.

6. Apparatus as claimed in claim 1, comprising a plurality of physical registers configured to store data values to be manipulated and renaming circuitry configured to store register mapping data mapping between a bank specifier value and a row specifier value identifying an architectural register and one of said physical registers to be used in place of said architectural register for speculative execution of a program instruction.

7. Apparatus as claimed in claim 1, wherein a plurality of architectural registers corresponding to one of a first logical register or a second logical register is identified with register specifying signals transferred within said apparatus identifying a single architectural register value in said common address format and a size qualifier value.

8. Apparatus as claimed in claim 1, wherein said first logical registers have a size of any of a single word of data, a double word of data and a quad word of data.

9. Apparatus as claimed in claim 4, wherein said first logical registers have a size of any of a single word of data, a double word of data and a quad word of data and said group of architectural registers corresponds to four first logical registers of a single word of data, two first logical registers of a double word of data and one first logical register of a quad word of data.

10. Apparatus as claimed in claim 1, wherein said second logical registers have a size of any of a single word of data, a double word of data and a quad word of data.

11. Apparatus as claimed in claim 5, wherein said second logical registers have a size of any of a single word of data, a double word of data and a quad word of data and said group of architectural registers corresponds to four second logical registers of a single word of data, two second logical registers of a double word of data and one second logical register of a quad word of data.

12. Apparatus for processing data comprising:
    processing means for performing processing operations;
    a plurality of architectural register means for storing operand values;
    first decoder means for decoding program instructions of a first instruction set to generate control signals for controlling said processing means to perform processing operations; and
    second decoder means for decoding program instructions of a second instruction set to generate control signals for controlling said processing means to perform processing operations; wherein
    program instructions of said first instruction set include first logical register specifiers specifying first logical register means for holding operand values, said first logical register means corresponding to architectural register means and having a plurality of different sizes corresponding to different numbers of words of data up to a maximum number of words of data;
    program instructions of said second instruction set include second logical register specifiers specifying second logical register means for holding operand values, said second logical register means corresponding to architectural register means and having a plurality of different sizes corresponding to different numbers of words of data up to said maximum number of words of data;
    said first decoder means maps said first logical specifiers using a first mapping to a common address format;

said second decoder means maps said second logical specifiers using a second mapping to said common address format; and said second mapping is divergent from said first mapping wherein at least some values used as both a first logical register specifier and a second logical register specifier map to different architectural register means.

13. A method of processing data comprising the steps of:

performing processing operations with processing circuitry;

storing operand values in a plurality of architectural registers of an architectural register file;

decoding program instructions of a first instruction set to generate control signals for controlling said processing circuitry to perform processing operations; and decoding program instructions of a second instruction set to generate control signals for controlling said processing circuitry to perform processing operations; wherein program instructions of said first instruction set include first logical register specifiers specifying first logical registers holding operand values, said first logical registers corresponding to architectural registers within said architectural register file and having a plurality of different sizes corresponding to different numbers of words of data up to a maximum number of words of data;

program instructions of said second instruction set include second logical register specifiers specifying second logical registers holding operand values, said second logical registers corresponding to architectural registers within said architectural register file and having a plurality of different sizes corresponding to different numbers of words of data up to said maximum number of words of data; further comprising the steps of:

using a first mapping to map said first logical specifiers to a common address format; and using a second mapping to map said second logical specifiers to said common address format; wherein said second mapping is divergent from said first mapping wherein at least some values used as both a first logical register specifier and a second logical register specifier map to different architectural registers.

14. A method as claimed in claim 12, comprising the steps of addressing said plurality of architectural register as an array of architectural registers arranged in a plurality of banks and a plurality of rows and said common address format comprises a bank specifier and a row specifier within said array.

15. A method as claimed in claim 12, wherein said plurality of banks permit first logical registers and second logical registers having said maximum number of words to be stored in a single row of said array.

16. A method as claimed in claim 12, wherein one of said first logical registers of said maximum number of words corresponds to a group of architectural registers that are all mapped by said first mapping to a plurality of first logical registers at each different lower size.

17. A method as claimed in claim 12, wherein one of said second logical registers of said maximum number of words corresponds to a group of architectural registers that at least one of which is mapped by said second mapping to a single second logical register at each different lower size.

18. A method as claimed in claim 12, comprising the steps of storing data values to be manipulated in a plurality of physical registers and storing register mapping data mapping between a bank specifier value and a row specifier value identifying an architectural register and one of said physical registers to be used in place of said architectural register for speculative execution of a program instruction.

19. A method as claimed in claim 12, comprising the step of identifying a plurality of architectural registers corresponding to one of a first logical register or a second logical register with register specifying signals identifying a single architectural register value in said common address format and a size qualifier value.

20. A method as claimed in claim 12, wherein said first logical registers have a size of any of a single word of data, a double word of data and a quad word of data.

21. A method as claimed in claim 16, wherein said first logical registers have a size of any of a single word of data, a double word of data and a quad word of data and said group of architectural registers corresponds to four first logical registers of a single word of data, two first logical registers of a double word of data and one first logical register of a quad word of data.

22. A method as claimed in claim 12, wherein said second logical registers have a size of any of a single word of data, a double word of data and a quad word of data.

23. A method as claimed in claim 17, wherein said second logical registers have a size of any of a single word of data, a double word of data and a quad word of data and said group of architectural registers corresponds to four second logical registers of a single word of data, two second logical registers of a double word of data and one second logical register of a quad word of data.

* * * * *